(12) United States Patent
Stimel, Jr.

(10) Patent No.: US 8,950,021 B2
(45) Date of Patent: *Feb. 10, 2015

(54) RETRACTABLE BUNK

(71) Applicant: William E. Stimel, Jr., Alexandria, OH (US)

(72) Inventor: William E. Stimel, Jr., Alexandria, OH (US)

(73) Assignee: CVG Management Corporation, New Albany, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,792

(22) Filed: Mar. 20, 2013

(65) Prior Publication Data

US 2013/0212805 A1    Aug. 22, 2013

Related U.S. Application Data

(63) Continuation of application No. 13/224,012, filed on Sep. 1, 2011, now Pat. No. 8,424,132.

(60) Provisional application No. 61/379,947, filed on Sep. 3, 2010.

(51) Int. Cl.
| | | |
|---|---|---|
| *A47C 27/14* | (2006.01) | |
| *B60N 2/34* | (2006.01) | |
| *B60P 3/38* | (2006.01) | |
| *B60P 3/39* | (2006.01) | |
| *A47C 17/80* | (2006.01) | |
| *B60N 2/24* | (2006.01) | |
| *B60N 2/30* | (2006.01) | |
| *B60N 2/70* | (2006.01) | |

(52) U.S. Cl.
CPC . *B60P 3/39* (2013.01); *A47C 17/80* (2013.01); *B60N 2/24* (2013.01); *B60N 2/3056* (2013.01); *B60N 2/34* (2013.01); *B60N 2/7011* (2013.01)
USPC ............ 5/118; 5/9.1; 5/187; 296/190.02

(58) Field of Classification Search
USPC ............ 5/118, 122, 123, 127, 9.1, 187; 105/316, 319, 320; 114/192; 296/190.02, 98, 24, 43, 100.15, 296/100.16; 160/23.1, 24, 370.22
See application file for complete search history.

(56) References Cited

U.S. PATENT DOCUMENTS

| | | | | |
|---|---|---|---|---|
| 1,749,888 | A | * | 3/1930 | Reeder ............................... 5/122 |
| 1,897,521 | A | | 2/1933 | Legarde |
| 2,835,903 | A | * | 5/1958 | Roy ................................... 5/118 |
| 3,480,975 | A | * | 12/1969 | Colchin et al. .................... 5/118 |
| 4,659,137 | A | * | 4/1987 | Chassaing et al. ........ 296/190.02 |
| 4,700,418 | A | | 10/1987 | Ritter |

(Continued)

OTHER PUBLICATIONS

Young, Lee W. Notification of Transmittal of the International Search Report and the Written Opinion of the International Searching Authority, or the Declaration. Feb. 9, 2012.

*Primary Examiner* — Michael Trettel
(74) *Attorney, Agent, or Firm* — Kegler Brown Hill & Ritter; James J. Pingor (57) ABSTRACT

A retractable bunk or bed is disclosed. The retractable bunk can be used in a sleeper compartment so as to optimize space within the cab. The innovation can include a shaft around which a suitably strong, yet flexible, material bunk can be wound. Thus, in a closed or "hidden" state, the material can be rolled up around the shaft and stowed, for example behind a door or within a compartment as desired. In an open position, the material is extended in a horizontal manner and affixed to retain the "bunk" position.

18 Claims, 10 Drawing Sheets

(56) References Cited

U.S. PATENT DOCUMENTS

| | | |
|---|---|---|
| 5,106,141 A | 4/1992 | Mostashari |
| 5,432,963 A * | 7/1995 | Coral et al. ........................ 5/118 |
| 6,053,556 A | 4/2000 | Webb |
| 8,117,691 B2 * | 2/2012 | Bishop .............................. 5/118 |
| 8,424,132 B2 * | 4/2013 | Stimel .............................. 5/118 |
| 2009/0236874 A1 | 9/2009 | Ekberg |
| 2010/0050338 A1 | 3/2010 | Overtone |

* cited by examiner

RETRACTABLE BUNK

CROSS-REFERENCE TO RELATED APPLICATIONS

This application is a continuation of U.S. patent application Ser. No. 13/224,012 entitled "RETRACTABLE BUNK" and filed Sep. 1, 2011, now U.S. Pat. No. 8,424,132, which claims the benefit of U.S. Provisional Patent application Ser. No. 61/379,947 entitled "RETRACTABLE BUNK" and filed Sep. 3, 2010. The entirety of the above-noted applications are incorporated by reference herein.

BACKGROUND

The cabin or "cab" of a truck is an enclosed space where the operator (or driver) is seated when operating a vehicle. Today, long-haul truck cabs often include many amenities that enhance comfort of a driver. These amenities include air conditioning, ergonomic seats and controls, hi-fi sound and entertainment packages, etc.

The rearward portion of some cabs often includes a sleeper compartment equipped with amenities and services which include televisions, Wi-Fi Internet access, beds and the like. A sleeper is often a separate compartment attached to the cab where the driver can rest while not driving. Sleeper units can range from a simple bunk compartment to a spacious "apartment-on-wheels."

Because space is limited within the sleeper portion of a cab, many appliances and the like have been reduced in size to accommodate and maximize space. Similarly, furnishings are strategically designed to optimize the limited space available in a cab. There exists a need to continue to develop space-saving furnishings for inside a sleeper compartment of a cab.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a retractable bunk or bed. In aspects, this retractable bunk can be used in a truck's "sleeper" compartment so as to optimize space within the cab. The retractable bunk can include a shaft around which a material bunk can be wound. The bunk can be made of most any suitably strong yet flexible material that enables winding and can sustain the weight of an individual when unwound (and locked) in a horizontal fashion. Thus, in a closed, wound or "hidden" position, the material is rolled up around the shaft and stowed, for example behind a door or within a compartment as desired. In an open position, the material is extended in a horizontal manner and affixed to retain the "bunk" position.

In another aspect of the subject innovation, the bunk can be equipped with a spring-loaded or other auto-retractable mechanism such that, when unlatched, the retractable bunk can be rewound and stowed with ease. When in a wound state, the bunk can be hidden, e.g., behind a panel, if desired. This windup bunk can assist in maximization of space within a truck's sleeper compartment.

In yet other aspects, the retractable bunk can be equipped with motorized units and controls so as to effect automatic deployment. Some aspects can be deployed manually as well as motorized as desired.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

Figure 1:
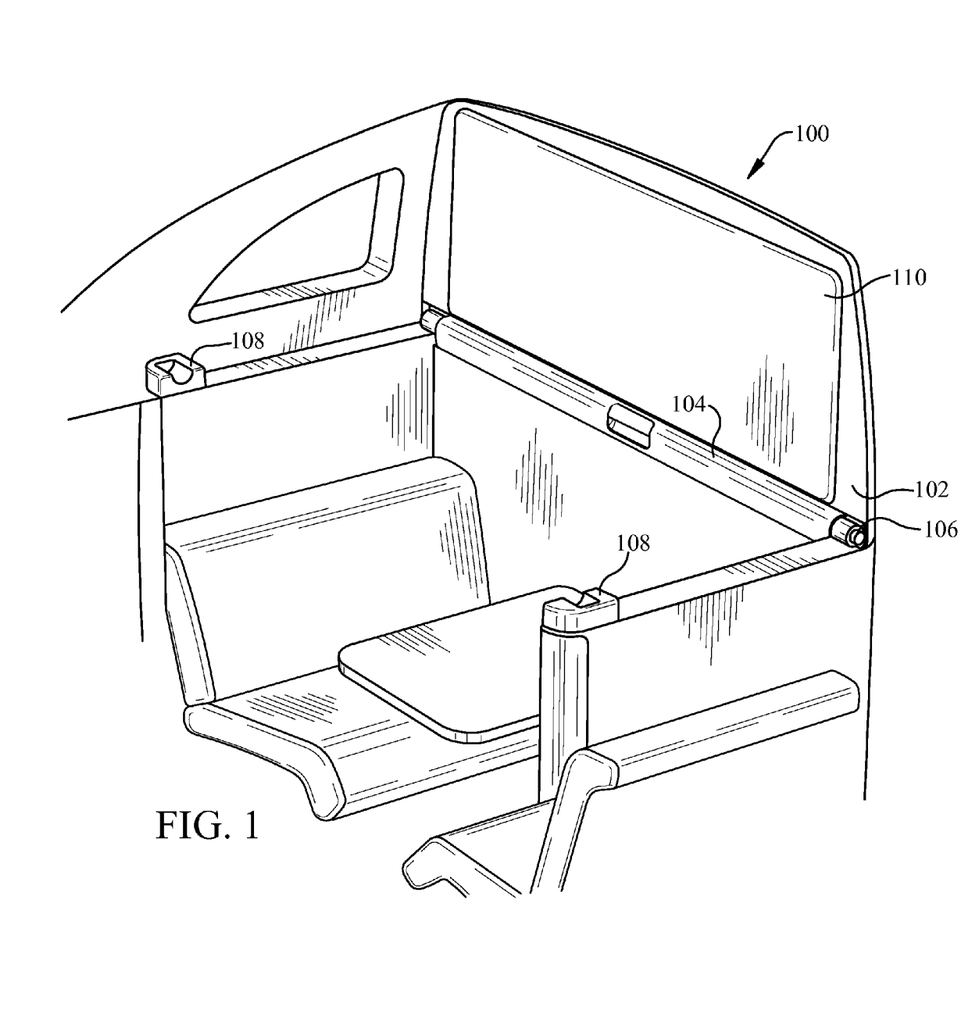
FIG. 1 illustrates an example retractable bunk assembly in a retracted state in accordance with aspects of the innovation.

Referring initially to the drawings, FIG. 1 illustrates an example retractable bunk system 100 in accordance with aspects of the innovation. Generally, in one aspect, the retractable bunk system 100 can include a roller assembly 102 (not shown) capable of rolling (or wrapping) material 104 thereon. In aspects, the roller mechanism 102 can include a spring mechanism (not shown) that effects auto-winding and provides resistance when unwinding (and assistance when winding) the material 104 upon mechanism 102. In these aspects, it will be appreciated that the mechanism's rod or roller 102 can include at least one end that rotates independent of the pin. As will be understood, each end of the roller mechanism 102 can be removeably positioned within a notch or holder so as to retain the roller when unwound while at the same time enabling the roller to spin or rotate thereby enabling unwinding of the bunk material. In other aspects, the mechanism can be fixedly attached, e.g., within a compartment, wall, etc.

As shown in FIG. 1, a material 104, e.g., trampoline-like material, can be wrapped upon roller mechanism 102 (not shown). In the aspect, in its wrapped (or wound) state, as shown, the retractable bunk assembly 100 is compact thereby not occupying much space within the cab. It will be understood that each end of the roller assembly 102 can be attached into a bracket or catcher such that it is able to freely (or substantially freely) rotate.

In operation, once extended (or unrolled), the material 104 creates a bunk-like surface upon which an individual can sit or lay. Similarly, the in its unrolled state, the extended material can be used as a shelf or other storage location. Once extended, as shown, a locking rod 106 can be attached to the material so as to be latched (or otherwise positioned) into roller catches 108. These catches 108 will be better described upon a review of the figures that follow. Here, in operation, the roller mechanism 102 can be rotated while the material is unwound. As shown, the material can be equipped with a support rod (or a plurality of pins) 106 which can be inserted within the catches 108 thereby holding the material in an taut or extended state.

While one set of catches 108 is shown, it is to be understood that additional (or adjustable) catches can be employed so as to enable adjustment of the tension applied to the unwound material. In aspects, an additional set of catches 108 can positioned closer to the winding mechanism 102 such that the material will be less-taut upon securing. Still further, catches 108 can be equipped upon tracks or slides so as to enable adjustment of the distance from the roller mechanism 102. As will be understood, the closer the catches 108 are to the roller mechanism 102, more slack can be provided in the material.

In alternative aspects, an optional cushion 110 can be employed to rest upon the extended fabric or material 104. As described above, the fabric or material 104 can be most any material capable of supporting the weight of a human body. In some aspects, the material is rubber-based such as that used in a trampoline. In others, suitably strong netting (e.g., nylon) can be employed. It is to be understood that most any material known in the art can be employed without departing from the spirit and/or scope of the innovation and claims appended hereto.

While the aspect illustrated in FIG. 1 illustrates that the bunk can be retracted or extended from a wound coil of material mounted or otherwise hidden within a wall unit, other aspects contemplate the material being coiled or wound around the rod 104. These alternative aspects are to be included within the scope of this innovation and claims appended hereto.

Figure 2:
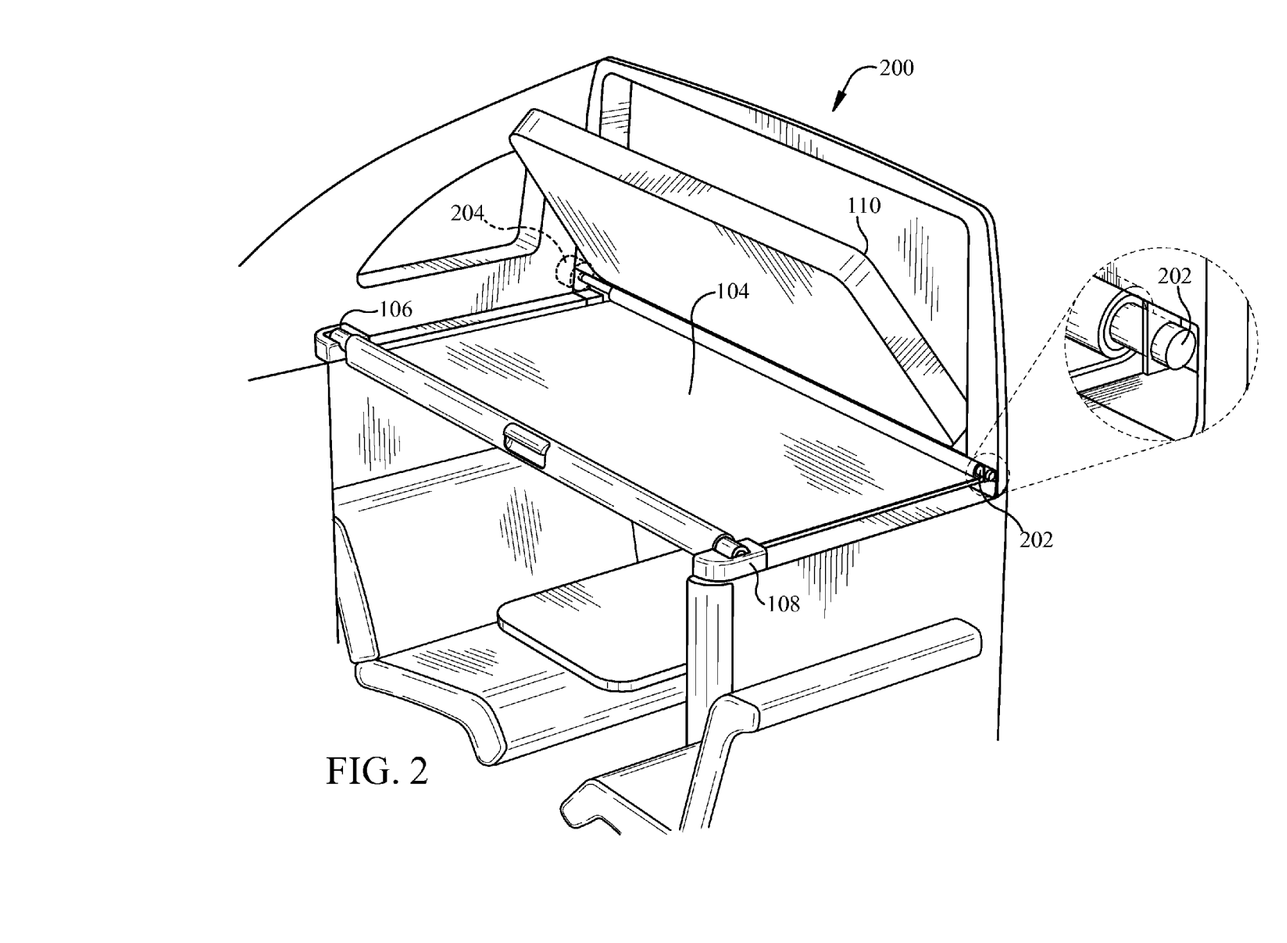
FIG. 2 illustrates an example retractable bunk assembly in an extended state in accordance with aspects of the innovation.

Turning now to FIG. 2, an example view of a retractable bunk assembly 200 is shown in accordance with an aspect of the innovation. As illustrated, the retractable bed assembly 200 is shown in an extended or opened position. In other words, as depicted, the material 104 is extended and the roller 106 is positioned within catches (or holders) 108. In this orientation, an individual can sit or lay directly upon the material 104, whereas the bunk can support the weight of the person.

Alternatively, and optionally, a cushion 110 can be positioned atop the material in a horizontal manner thereby providing additional cushion (and support) for comfort. In aspects, it will be understood that the cushion 110 can be manufactured from most any suitable materials (e.g., foam) and covered with cloth, leather, vinyl or the like thereby enhancing comfort and support. Further, as shown the material 104 can be fixedly attached to a backwall by way of a support rod 202 as shown (a portion of wound material or length of stored material is also shown near support rod 202 in the inset). Other aspects can employ most any attachment means know so as to attach the material to the back wall. As described supra, the coiling (or winding) mechanism can be positioned at the innermost (near the wall as shown) or outermost location (e.g., about rod 106). In yet other aspects, the retractable bunk can be equipped with motorized units and controls such as at or near location 204 so as to effect automatic deployment. Some aspects can be deployed manually as well as motorized as desired. These alternative aspects are to be included within the scope of the innovation without departing from the features, functions and benefits described herein.

As stated supra, the material 104 can be most any suitably rollable material having strength to withstand weight of a human body. For example, the material 104 can be a rubber-based trampoline-like material, a reinforced nylon netting, or other material. The shaft of the roller 106 can be manufactured of most any material including, but not limited to, wood, steel, aluminum, alloy, composites or the like. In one example, the roller bar 106 has a round cross-section that facilitates ease of rolling. However, it is to be understood and appreciated that other shapes including hexagons, pentagons, ovals, squares or the like can be employed as appropriate.

Figure 9:
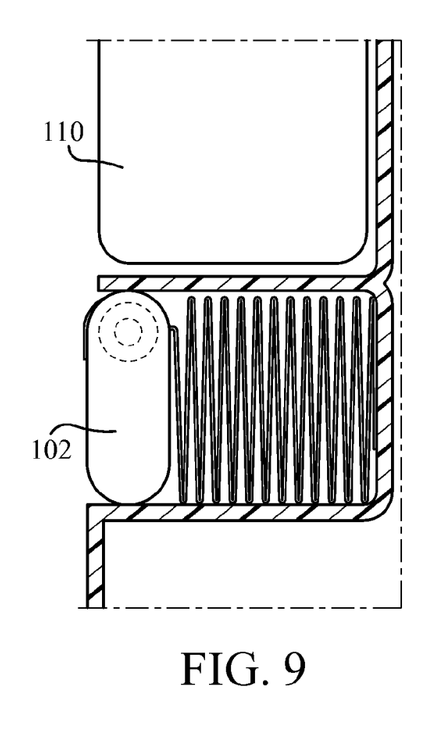
FIG. 9 illustrates an example bunk segmented and folded (or bent) in an accordion-like manner for storage.
Figure 10:
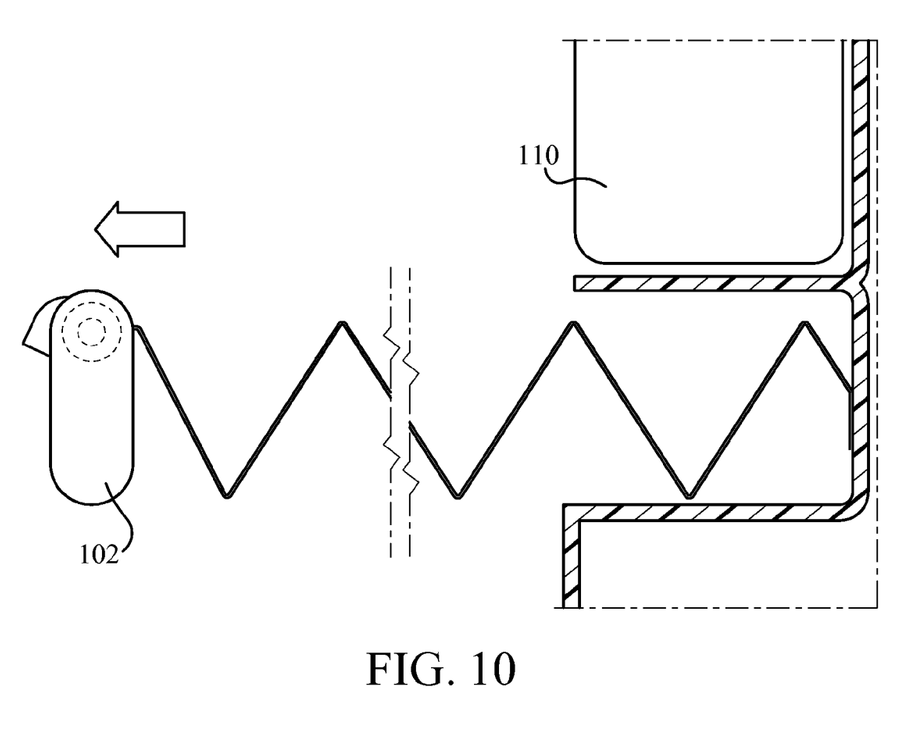
FIG. 10 illustrates an example bunk partially segmented and folded (or bent) in an accordion-like manner for storage.

Additionally, in yet other aspects, the bunk can be segmented and folded (or bent) in an accordion-like manner for storage as shown in FIGS. 9 and 10, discussed below. Still further, the segmented (and semi-rigid) bunk (not shown) can be guided (e.g., slidably traversed) into the back wall and stowed in that manner. These semi-rigid aspects are to be included within the spirit and scope of this specification.

Figure 3:
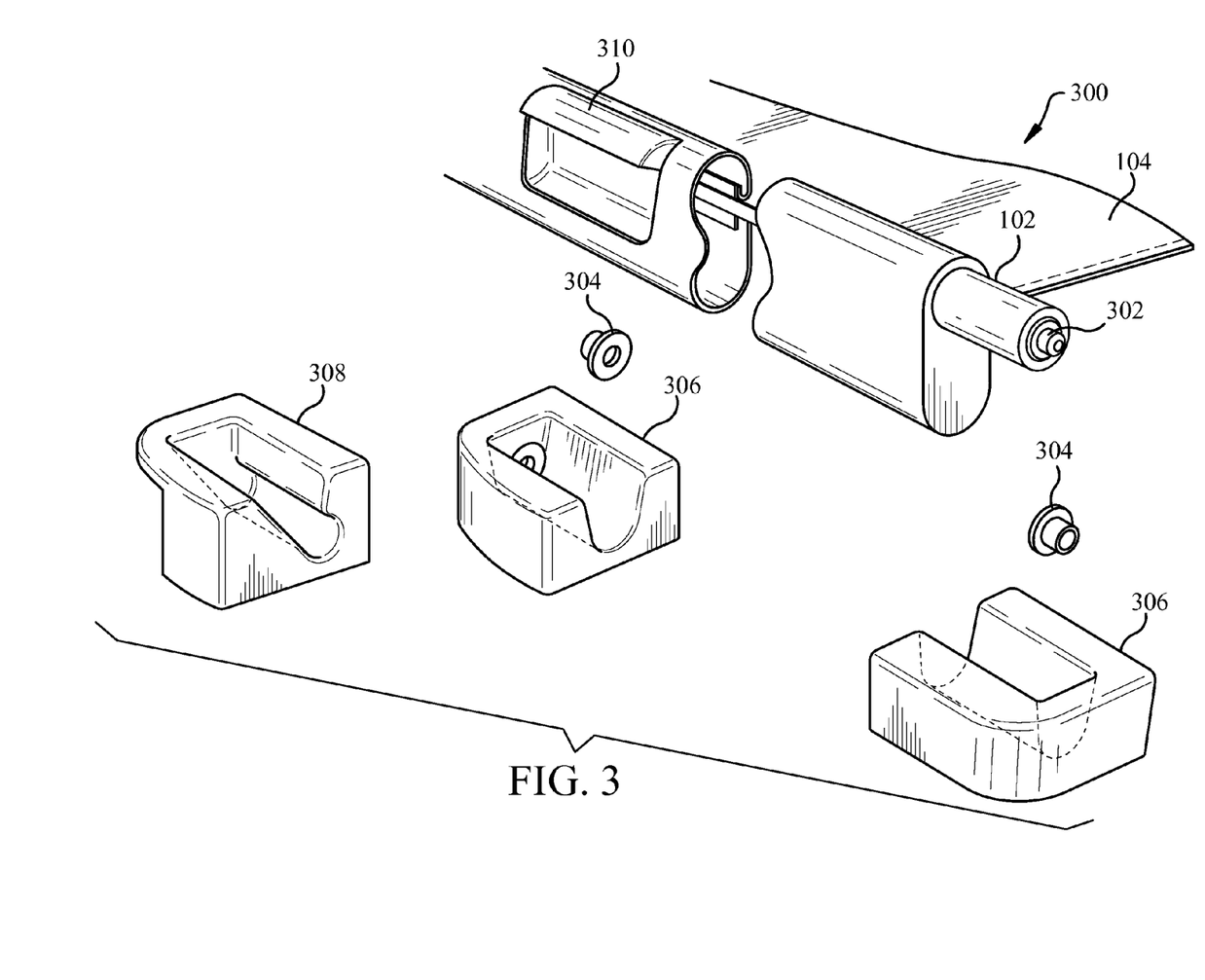
FIG. 3 illustrates example hardware and catch assemblies in accordance with aspects of the innovation.

FIG. 3 illustrates an alternate view 300 of a roller mechanism 102 in accordance with aspects of the innovation. As shown in the alternate view, roller 102 can be equipped with a spring-loaded rod 302 positioned with the interior length of the roller 102. The rod 302 is configured to rotate in at least one direction. For example, the rod 302 is spring-loaded such that resistance is provided to retain the material 104 in a taut state upon rolling out. Once rolled to a desired length, the rod 302 engages thereby not enabling additional roll-out of material 104.

Hardware, including bushings (e.g., metal or plastic bushings) 304 can be applied to each end of the rod 302. The bushings 304 can be press fit onto each end of rod 302. When extended, the bushings 304 along with a portion of the roller 102 can be fit into catches 306 thereby retaining the material 104 in a taut state. In operation, the bushings 304 (and roller 102) can "snap" or otherwise be frictionally attached into the catches 306.

It will be appreciated that catches 306 can be configured in a vertical slot-like manner as shown with regard to catches 306. In an alternative design, an angled slot-like manner can be employed as illustrated with regard to catch 308. In this manner, the catch 308 can naturally retain the rod 102 in relation to the spring-back tension or friction. In other words, the locking feature can be inherently included within the angled shape of the catch 308.

With continued reference to FIG. 3, the retractable bunk assembly 300 can be equipped with a lockable handle 310. The lockable handle 310 can be manufactured so as to permit unwinding when in an "open" or "unlocked" (up) position (as shown). When "locked," the handle can be pivoted downward. It will be appreciated that most any handle/lock assembly can be employed without departing from the spirit and/or scope of the innovation.

Figure 4:
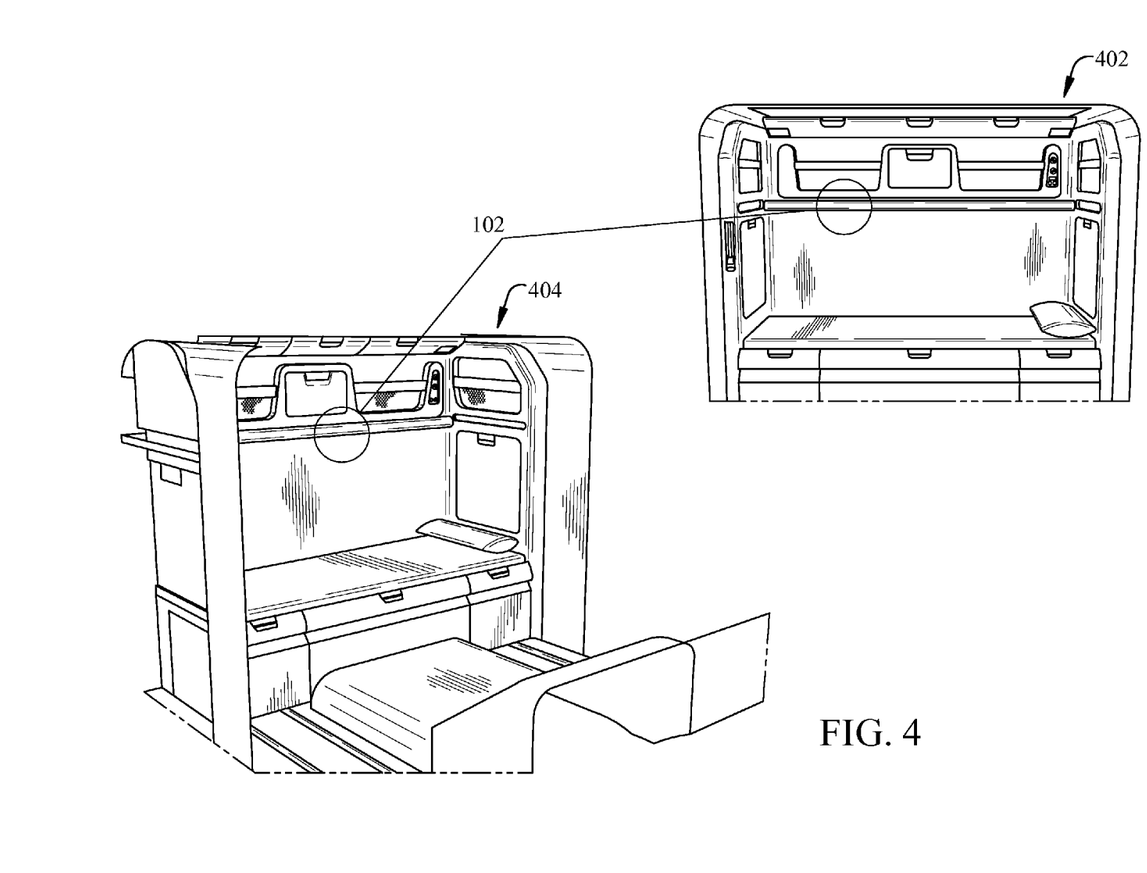
FIG. 4 illustrates example bunk assemblies in retracted states in accordance with aspects of the innovation.

Turning now to FIG. 4, a front view of an alternative bunk assembly 402 in a retracted position is shown. As illustrated, the bunk assembly is retracted thereby increasing cab space. Additionally, it is to be appreciated that the retracted bunk assembly 402 can be equipped with or without an optional cushion as described supra.

Alternative perspective view 404 of a bunk in a retracted position is shown in FIG. 4. It is to be understood that, while a specific configuration is shown and described herein, alternative aspects can be employed without departing from the spirit and/or scope of the features, functions and benefits described herein. As described above, the retractable material can be employed as a bunk or other shelf or storage area. Further, while a bunk-sized example is shown and described, it is to be understood that the innovation can be employed in larger or smaller sizes, for example, to provide a small storage shelf or table area as desired. These alternative aspects are to be included within the scope of the innovation described herein.

Figure 5:
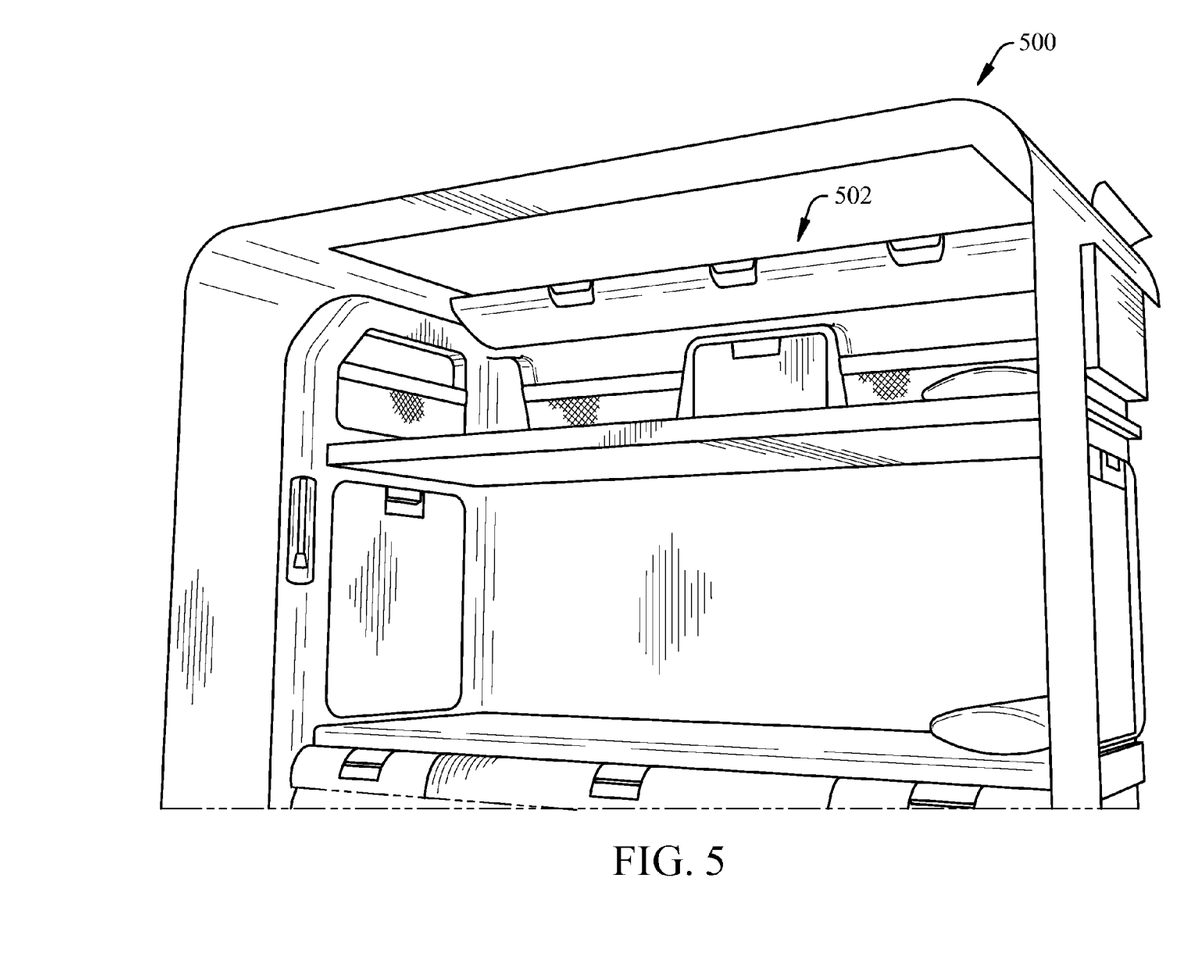
FIG. 5 illustrates example bunk assemblies in an open or extended and locked state in accordance with aspects of the innovation.

FIG. 5 illustrates an alternative aspect of a retractable bunk assembly 500 in an extended, and locked, state. As shown in FIG. 5, the bunk cabin can be equipped with a full length (or partial length) sun/moon roof 502 or window as desired. In aspects, the roof portion 502 can be retractable, removable or pop-up (or combinations thereof). Additionally, a blind or cover can be provided so as to cover or shade the bunk portion. It is to be appreciated that either or both the roof and/or the shade can be motorized as desired.

Figure 6:
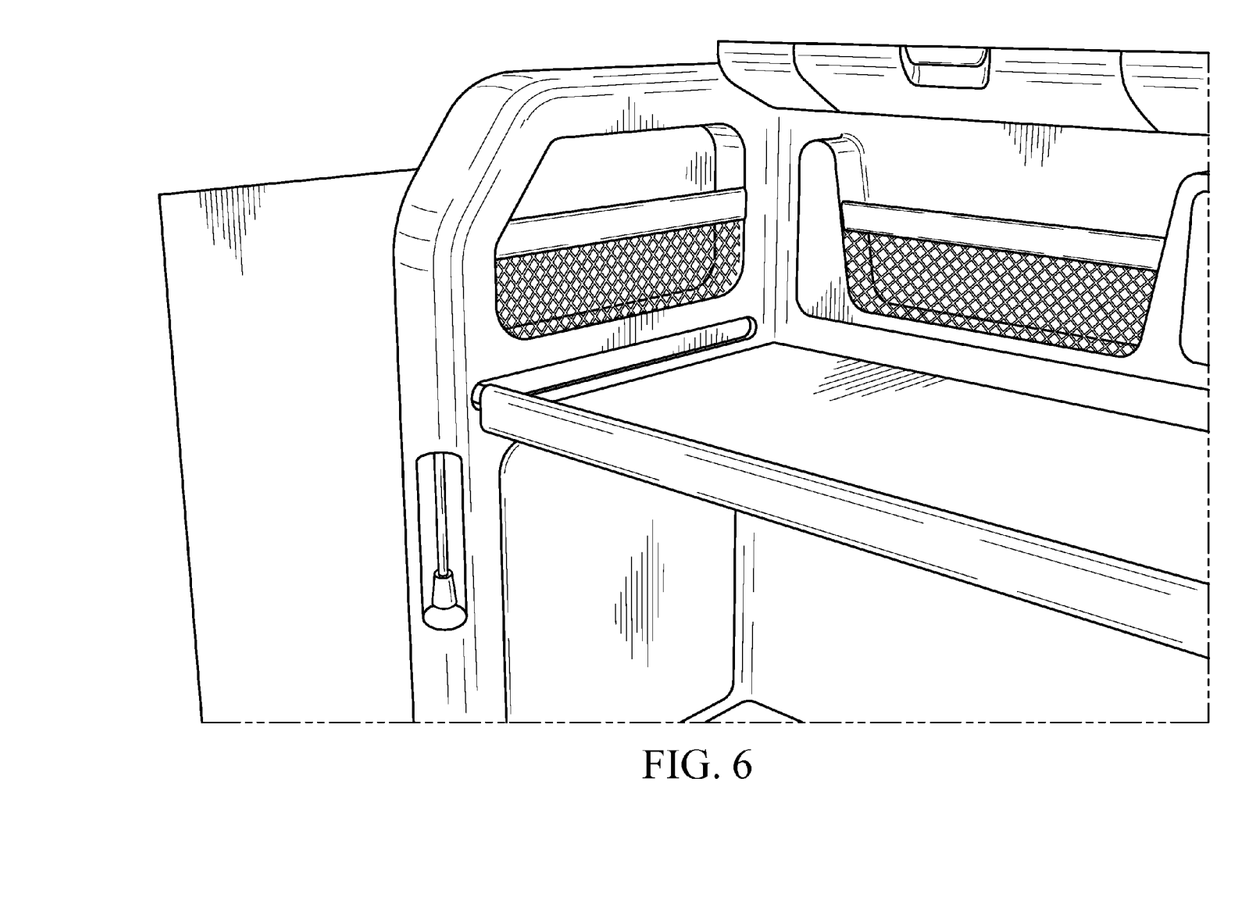
FIG. 6 illustrates example conveniences in a bunk area in accordance with aspects of the innovation.
Figure 7:
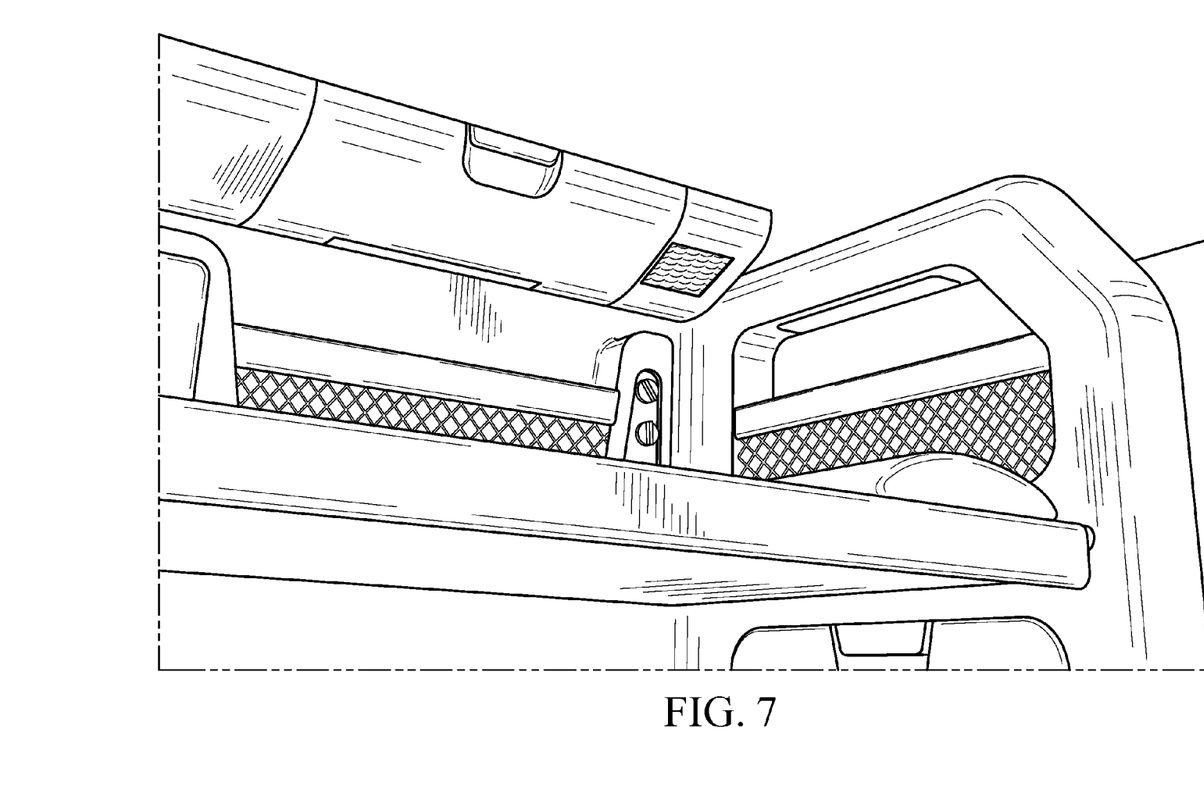
FIG. 7 illustrates example conveniences in a bunk area in accordance with aspects of the innovation.
Figure 8:
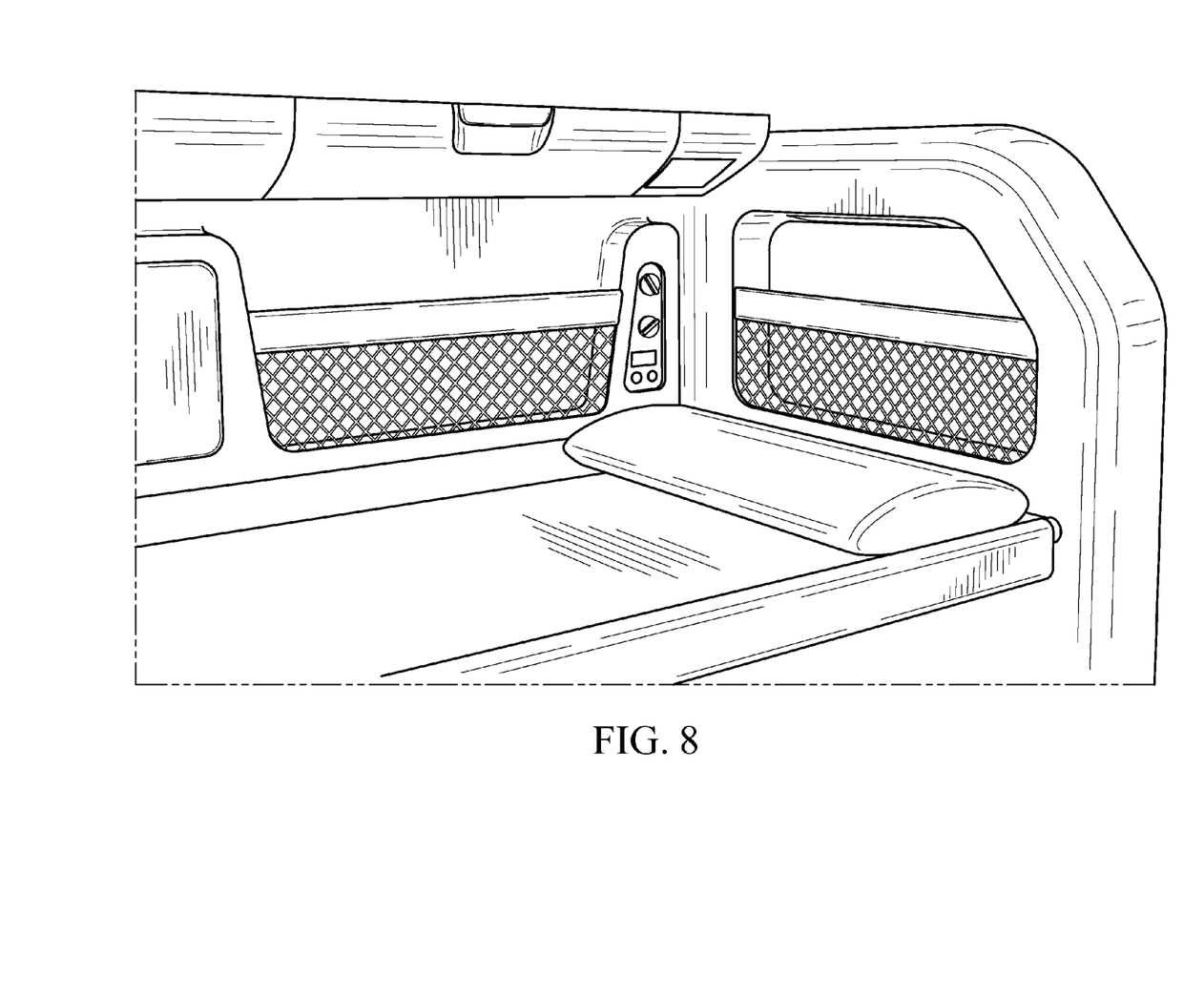
FIG. 8 illustrates example conveniences in a bunk area in accordance with aspects of the innovation.

Referring now to FIGS. 6, 7 and 8, additional conveniences to the retractable bunk assembly are shown. More particularly, the bunk area can be equipped with an over moulded soft (e.g., rubber) edge. Net storage bins can also be provided to enhance storage and convenience. While specific bins are shown, it is to be understood that most any storage compartments can be employed without departing from the spirit and/or scope of the innovation. Further, the retractable bunk environment can include a flexi-lamp as shown in FIG. 6.

FIG. 7 illustrates optional storage area lights as well as speaker modules. Other aspects can include air conditioning and heater ducts, etc. Overhead bins can be provided in order to assist with space maximization. Accordingly, FIG. 8 illustrates optional air-conditioning/heating and entertainment (e.g., radio, television) controls.

FIG. 9 illustrates an example bunk segmented and folded (or bent) in an accordion-like manner for storage. FIG. 10 illustrates an example bunk partially segmented and folded (or bent) in an accordion-like manner for storage.

Figure 11:
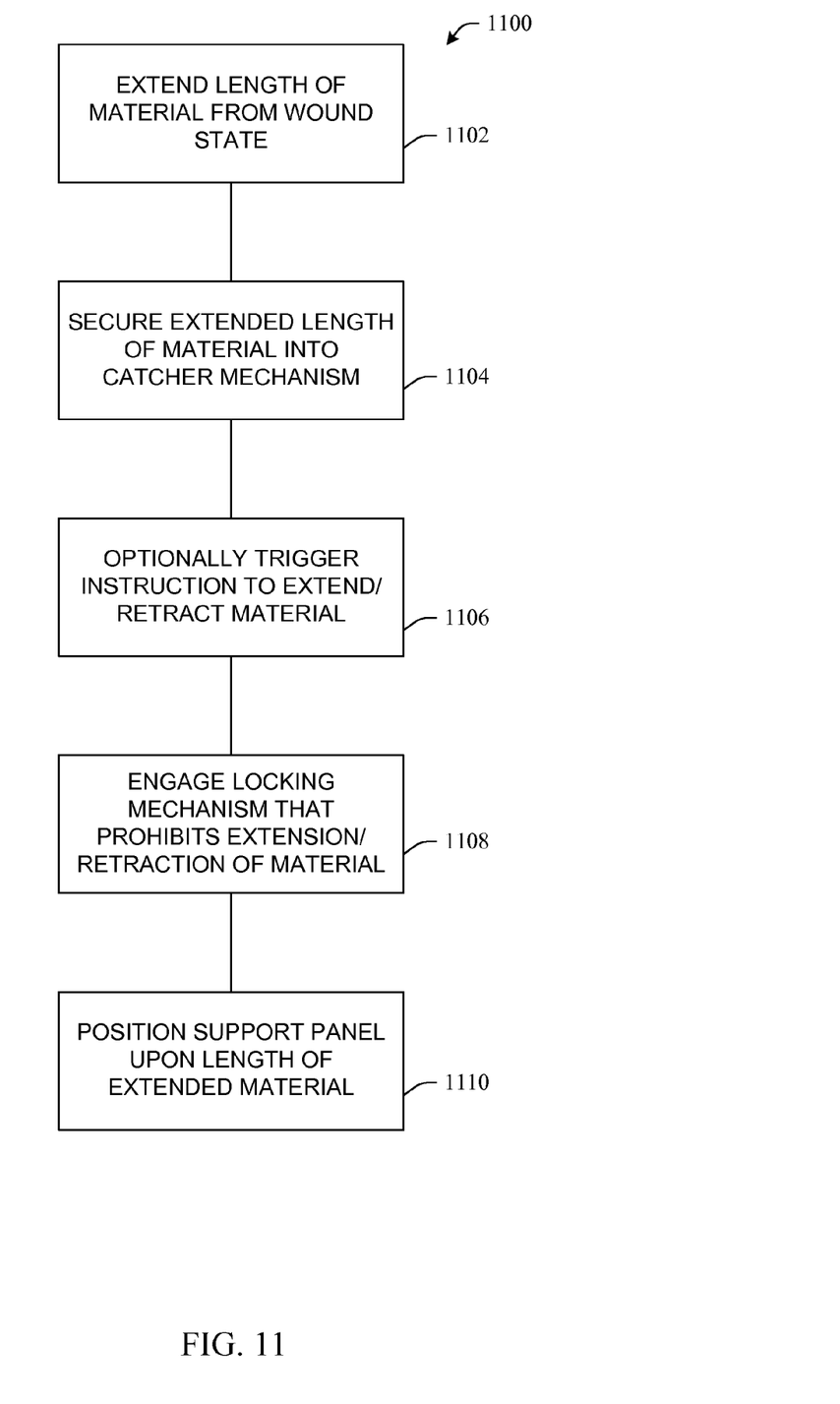
FIG. 11 illustrates an example method of providing a retractable bunk.

FIG. 11 illustrates an example method 1100 of providing a retractable bunk. Method 1100 can include the act 1102 of extending a length of material from a wound state, wherein the length of material is fixedly attached to a rod on one end and a fixed surface on the other. It can also include the act 1104 of securing the extended length of material into a catcher mechanism. It can further include one or more of an act 1106 of triggering an instruction to one of extend or retract the material, wherein the act of extending the length of material employs a motorized operation, an act 1108 of engaging a locking mechanism that prohibits extension or retraction of the material based upon position of a locking handle, or an act 1110 of positioning a support panel upon the extended length of material.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   an extension/retraction mechanism;
   a material that is fixedly attached to the extension/retraction mechanism on one end and to a fixed wall on the other end of a length, wherein the material extends and retracts based at least in part on a position of the extension/retraction mechanism relative to the fixed wall; and
   at least one catch or holder that retains the extension/retraction mechanism such that the material is in an extended state, wherein the at least one catch or holder employs a pair of notches that retain each end of the extension/retraction mechanism such that the material is in the extended state.

2. The system of claim 1, wherein the material is a flexible material.

3. The system of claim 1, wherein the material is a semi-rigid material.

4. The system of claim 1, wherein the at least one catch or holder comprises at least two catches or holders, and wherein a first catch or holder of the at least two catches or holders retains the extension/retraction mechanism at a first location, and wherein a second catch or holder of the at least two catches or holders retains the extension/retraction mechanism at a second location distinct from the first location.

5. The system of claim 1, wherein the extension/retraction mechanism comprises a spring mechanism that provides resistance when the material extends.

6. The system of claim 1, wherein a first catch or holder of the at least one catch or holder comprises a lockable handle, wherein the lockable handle secures the position of the extension/retraction mechanism relative to the fixed wall when in a locked position.

7. The system of claim 1, wherein a first catch or holder of the at least one catch or holder is adjustable and facilitates control of the tension of the material in the extended state based at least in part upon a position of the first catch or holder.

8. The system of claim 1, wherein the extension/retraction mechanism comprises one or more bushings, and wherein the at least one catch or holder retains the extension/retraction mechanism via attachment of the one or more bushings to the at least one catch or holder.

9. The system of claim 1, further comprising a motor that automatically extends or retracts the material to the extended state or a retracted state.

10. A method of providing a retractable surface, comprising:
    extending a length of material from a retracted state, wherein the length of material is fixedly attached to a rod on one end and a fixed surface on the other;
    securing the extended length of material via at least one catch or holder; and
    triggering an instruction to one of extend or retract the material, wherein the act of extending the length of material is based at least in part on a motorized operation.

11. The method of claim 10, wherein the material is a flexible material.

12. The method of claim 10, wherein the material is a semi-rigid material.

13. The method of claim 10, further comprising engaging a locking mechanism that prohibits extension or retraction of the material based upon a position of a locking handle.

14. The method of claim 10, further comprising adjusting a position of the at least one catch or holder.

15. The method of claim 10, wherein securing the extended length of material comprises securing the extended length of material via a frictional force.

16. A bunk system, comprising:
   means for storing a length of material;
   means for extending and retracting the length of material;
   means for locking the extension and retraction of the length of material; and
   means for securing the length of material in an extended state,
   wherein the means for extending and retracting comprises one or more bushings, and wherein the means for securing retains the means for extending and retracting via attachment of the one or more bushings to the means for securing.

17. The bunk system of claim 16, wherein the length of material is stored in a wound manner.

18. The bunk system of claim 16, wherein the length of material is stored in an accordion-like folded manner.

\* \* \* \* \*